US012711593B2

(12) United States Patent
Ginzburg et al.

(10) Patent No.: US 12,711,593 B2
(45) Date of Patent: Aug. 18, 2026

(54) IQV METRIC FOR 'FALSE COLOR' ARTIFACTS IN CHROMATIC AREAS

(71) Applicant: SAMSUNG ELECTRONICS CO., LTD., Suwon-si (KR)

(72) Inventors: Amos Ginzburg, Tel-Aviv (IL); Oren Suchoi, Tel-Aviv (IL); Yotam Roet, Tel-Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 240 days.

(21) Appl. No.: 18/627,296

(22) Filed: Apr. 4, 2024

(65) Prior Publication Data

US 2025/0315928 A1 Oct. 9, 2025

(51) Int. Cl.
*G06T 7/00* (2017.01)
*G06T 3/4015* (2024.01)

(52) U.S. Cl.
CPC .......... *G06T 7/0002* (2013.01); *G06T 3/4015* (2013.01); *G06T 2207/10024* (2013.01)

(58) Field of Classification Search
CPC ................. G06T 7/0002; G06T 3/4015; G06T 2207/10024
See application file for complete search history.

(56) References Cited

U.S. PATENT DOCUMENTS 5,311,212 A * 5/1994 Beretta ............... G06F 3/04845 715/974
7,656,437 B2 * 2/2010 Yamada ............... H04N 23/843 348/241

(Continued)

FOREIGN PATENT DOCUMENTS

CN 103747222 B 4/2016
EP 1748656 A1 * 1/2007 ........... H04N 23/843

(Continued)

OTHER PUBLICATIONS

Han et al., Jan. 2024, "No-Reference Color Dot Artifact Assessment for Remosaiced Images" (pp. 265-1-265-6)) (Year: 2024).*

(Continued)

*Primary Examiner* — Manav Seth

(74) *Attorney, Agent, or Firm* — Morgan, Lewis & Bockius LLP

(57) ABSTRACT

A method for determining an image quality verification (IQV) metric for false color artifacts in chromatic areas of digital images includes receiving a digital image that includes flat pure color patches and mixed color texture patches; processing the digital image in an image signal processing chain such that a red/green/blue image is produced; transforming the red/green/blue image into an LAB color space image; calculating, for each mixed color pixel in a mixed color texture patch, a chromatic distance in the LAB color space from the mixed color pixel in the mixed color texture patch to a center of each flat pure color patch; performing directional adjustments on each of the chromatic distances; and defining, for each mixed color patch, the IQV metric for the for the mixed color patch as a function of the distance metrics of each mixed color texture pixel in the mixed color patch.

20 Claims, 10 Drawing Sheets

(56) References Cited

U.S. PATENT DOCUMENTS

| | | | | |
|---|---|---|---|---|
| 8,605,164 | B2 | 12/2013 | Nashizawa | |
| 8,743,291 | B2 | 6/2014 | Li et al. | |
| 8,830,350 | B2 | 9/2014 | Yamada et al. | |
| 9,288,457 | B2 * | 3/2016 | Saito | G06T 5/20 |
| 9,396,531 | B2 * | 7/2016 | Panetta | G06T 7/0002 |
| 9,542,759 | B2 * | 1/2017 | Saito | H04N 25/135 |
| 10,237,519 | B2 | 3/2019 | Sato et al. | |
| 2009/0297026 | A1 * | 12/2009 | Abe | H04N 23/843<br>382/167 |
| 2019/0122395 | A1 * | 4/2019 | Fukasawa | G01J 3/52 |
| 2023/0069744 | A1 | 3/2023 | Lee et al. | |

FOREIGN PATENT DOCUMENTS

| | | | | |
|---|---|---|---|---|
| JP | 4629629 B2 | | 2/2011 | |
| WO | WO-2024072693 A1 | * | 4/2024 | G06T 3/4015 |

OTHER PUBLICATIONS

Shakar et al., 2018, “Quantification of Color Artifacts for the Evaluation of Color Filter Array Demosaicking” (pp. 48-53) (Year: 2018).*

Camera Image Quality Tradeoff Processing of Image Sensor Re-mosaic using Deep Neural Network.

DePhaseNet A deep convolutional network using phase differentiated layers and frequency based custom loss for RGBW image sensor demosaicing.

Automatic ISP Image Quality Tuning Using Nonlinear Optimization.

Hyperparameter optimization in black-box image processing using differentiable proxies (2019).

* cited by examiner

FIG. 1 – CIE LAB chromatic color space

FIG. 3A
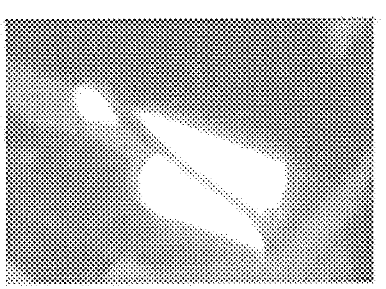
FIG. 3B
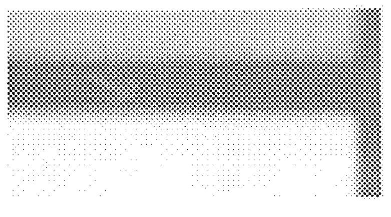
FIG. 3C
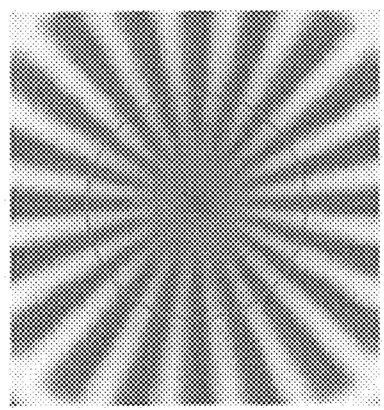
FIG. 3D
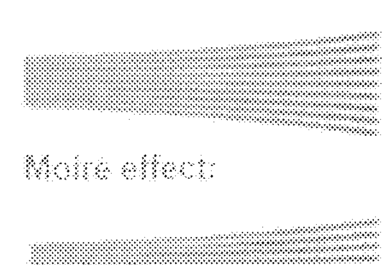
FIG. 3E

IQV METRIC FOR 'FALSE COLOR' ARTIFACTS IN CHROMATIC AREAS

TECHNICAL FIELD

Embodiments of the disclosure are directed to the technical field of image quality and image processing, and more particularly, to a new objective IQV metric for "false color" artifacts in chromatic areas of digital images.

DISCUSSION OF THE RELATED ART

Images acquired by image sensors pass through an image signal processing (ISP) chain to produce an output image. The output image is characterized by many image quality parameters that serve as key performance indicators (KPIs) for the tuning process of the chain. An ISP chain includes many blocks, some of which are responsible for image color artifacts. Each ISP block includes "tuning handles" that affect the bitmap pixel values and thus, image quality. Defining which tuning has better image quality and achieving a desired tuning is a very time-consuming task that is performed by professional image quality engineers.

Without an objective image quality verification (IQV) metric, image quality decisions can only be made by subjective evaluation, which requires many human resources, as well as a statistical image quality estimation conducted using a most opinion score (MOS). A collection of objective IQV metrics can automate the tuning of ISP chain blocks and lead to a much faster evaluation of image quality artifacts. Moreover, using a reliable objective metric as a cost-function enables the implementation of an ISP based neural network (ISP-NN).

SUMMARY

According to an embodiment of the disclosure, there is provided a method for determining an image quality verification (IQV) metric for false color artifacts in chromatic areas of digital images that includes receiving a digital image that includes one or more flat pure color patches and one or more mixed color texture patches, processing the digital image in an image signal processing (ISP) chain such that a red/green/blue (RGB) image is produced, transforming the RGB image into an LAB color space image, calculating, for each mixed color pixel in a mixed color texture patch, a chromatic distance in the LAB color space from the mixed color pixel in the mixed color texture patch to a center of each flat pure color patch, performing directional adjustments on each of the chromatic distances, and defining, for each mixed color patch, the IQV metric for the for the mixed color patch as a function of the distance metrics of each mixed color texture pixel in the mixed color patch.

According to a further embodiment of the disclosure, the ISP chain includes demosaicing.

According to a further embodiment of the disclosure, the function of the distance metrics of each mixed color texture pixel includes one of a maximum or a mean of the distance metrics over a predetermined top quantile of the distance metrics.

According to a further embodiment of the disclosure, a center of a flat pure color area is determined from a mean location of pixel values in the flat area pure color patch.

According to a further embodiment of the disclosure, a chromatic distance in the LAB color space from the mixed color pixel in the mixed color texture patch to a center of each flat pure color patch is a Euclidian distance to the (a*, b*) center of each flat pure color patch with a directional adjustment.

According to a further embodiment of the disclosure, the directional adjustments include replacing a Euclidean distance between a mixed color pixel and a center of a flat pure color patch with a radial projection towards an AB origin of the LAB color space, or with a tangential projection, or with a weighted sum of the projections.

According to a further embodiment of the disclosure, the projection of the Euclidean distance between a mixed color pixel i and a center of a flat pure color patch towards an AB origin of the LAB color space that represents a radial distance is calculated from $$Pr_i = \overrightarrow{d_1} \cdot \hat{P}_i = \frac{\text{abs}((P_{i_{a*}} - C_{1_{a*}}) * P_{i_{a*}}) + \text{abs}((P_{i_{b*}} - C_{1_{b*}}) * P_{i_{b*}})}{\sqrt{P_{1_{a*}}^2 + P_{1_{b*}}^2}},$$

wherein $d_1$ is a distance from the mixed color pixel to the center of a flat pure color patch, $C_{1a*}$ is an a* coordinate in the LAB color space of the center of the flat pure color patch, $C_{1b*}$ is a b* coordinate in the LAB color space of a center of the flat pure color patch, and $\hat{P}_i$ is the mixed color pixel in the color mixed texture area, with coordinates $P_{ia*}$ and $P_{ib*}$ in the LAB color space.

According to another embodiment of the disclosure, there is provided a method for determining an image quality verification (IQV) metric for false color artifacts in chromatic areas of digital images that includes calculating, for each mixed color pixel in a mixed color texture patch in a LAB color space image that includes one or more flat pure color patches and one or more mixed color texture patches, a chromatic distance in the LAB color space from the mixed color pixel in the mixed color texture patch to a center of each flat pure color patch, wherein a chromatic distance in the LAB color space from the mixed color pixel in the mixed color texture patch to the center of each flat pure color patch is a Euclidian distance to the (a*, b*) center of each flat pure color patch with directional adjustments, wherein the directional adjustments include replacing a Euclidean distance between a mixed color pixel and a center of a flat pure color patch with a radial projection towards an AB origin of the LAB color space, or with a tangential projection, and defining, for each mixed color patch, the IQV metric for the for the mixed color patch as a function of the distance metrics of each mixed color texture pixel in the mixed color patch.

According to a further embodiment of the disclosure, the projection of the Euclidean distance between a mixed color pixel i and a center of a flat pure color patch towards an AB origin of the LAB color space that represents a radial distance is calculated from $$Pr_i = \overrightarrow{d_1} \cdot \hat{P}_i = \frac{\text{abs}((P_{i_{a*}} - C_{1_{a*}}) * P_{i_{a*}}) + \text{abs}((P_{i_{b*}} - C_{1_{b*}}) * P_{i_{b*}})}{\sqrt{P_{1_{a*}}^2 + P_{1_{b*}}^2}},$$

wherein $d_1$ is a distance from the mixed color pixel to the center of a flat pure color patch, $C_{1a*}$ is an a* coordinate in the LAB color space of the center of the flat pure color patch, $C_{1b*}$ is a b* coordinate in the LAB color space of a center of the flat pure color patch, and $\hat{P}_i$ is the mixed color pixel in the color mixed texture area, with coordinates $P_{ia*}$ and $P_{ib*}$ in the LAB color space.

According to a further embodiment of the disclosure, the method includes receiving a digital image that includes the plurality of flat pure color patches and the plurality of mixed color texture patches, processing the digital image in an image signal processing (ISP) chain such that a red/green/blue (RGB) image is produced, and transforming the RGB image into the digital LAB color space image.

According to a further embodiment of the disclosure, the ISP chain includes demosaicing.

According to a further embodiment of the disclosure, a center of a flat pure color area is determined from a mean location of pixel values in the flat area pure color patch.

According to a further embodiment of the disclosure, the function of the distance metrics of each mixed color texture pixel is one of a maximum or a mean of the distance metrics over a predetermined top quantile of the distance metrics.

According to another embodiment of the disclosure, there is provided a non-transitory program storage device readable by a computer, tangibly embodying a program of instructions executed by the computer to perform a method for determining an image quality verification (IQV) metric for false color artifacts in chromatic areas of digital images.

BRIEF DESCRIPTION OF THE DRAWINGS

FIGS. 3A to 3E show examples of false color artifacts, according to an embodiment of the disclosure.

DETAILED DESCRIPTION

Figure 1:
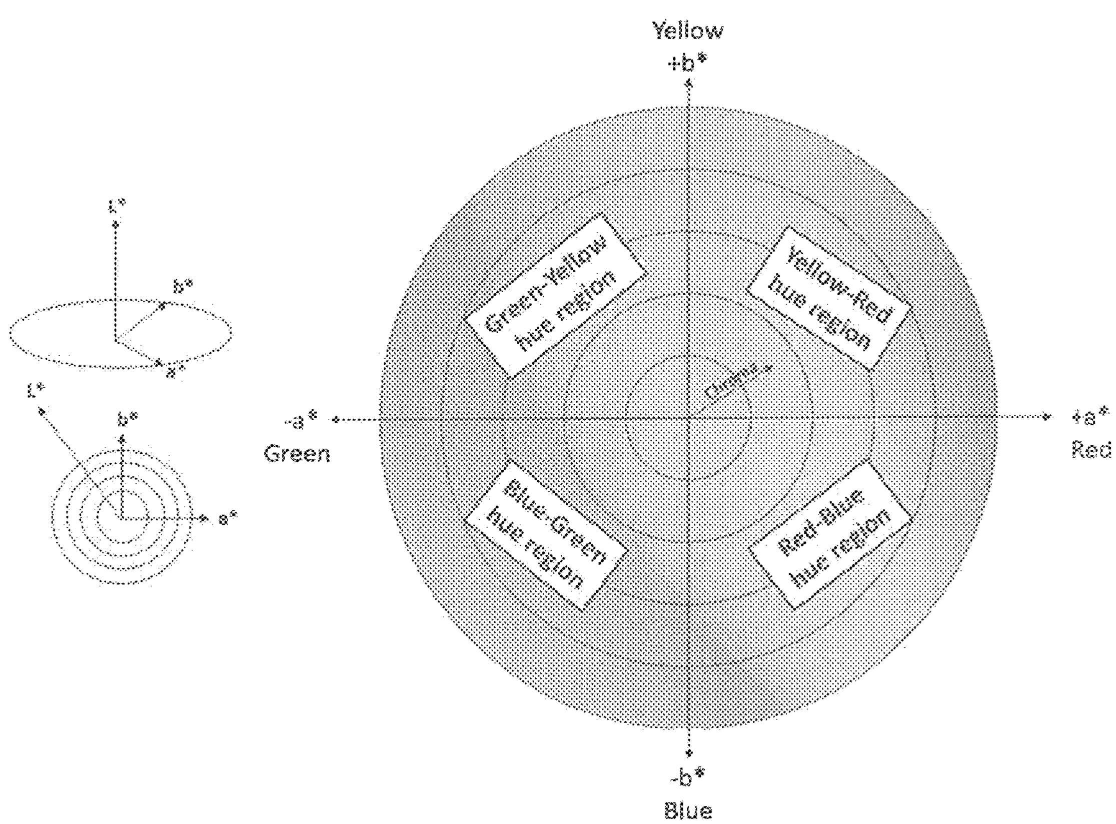
FIG. 1 illustrates a CIE-LAB chromatic color space, according to an embodiment of the disclosure.

Embodiments of the disclosure are directed to calculating a "chromatic distance" from color mixed texture area pixels to their respectively flat "pure colors" cluster using the post demosaicing image in a perceptual transformed color-space, such as the CIE-LAB, illustrated in FIG. 1. A pure color cluster or patch has red, green or blue color values that are normally distributed about a mean value with a noise limited standard deviation.

LAB (L*a*b*) color space is a chromatic color-space defined by the International Commission on Illumination (abbreviated CIE) in 1976, in which:

'L*' is the lightness.

'a*' is the horizontal (red/green) chromatic axis.

'b*' is the vertical (blue/yellow) chromatic axis.

The 2D a*b* origin (0,0) is a non-chromatic value which refers to black and white.

Figure 2:
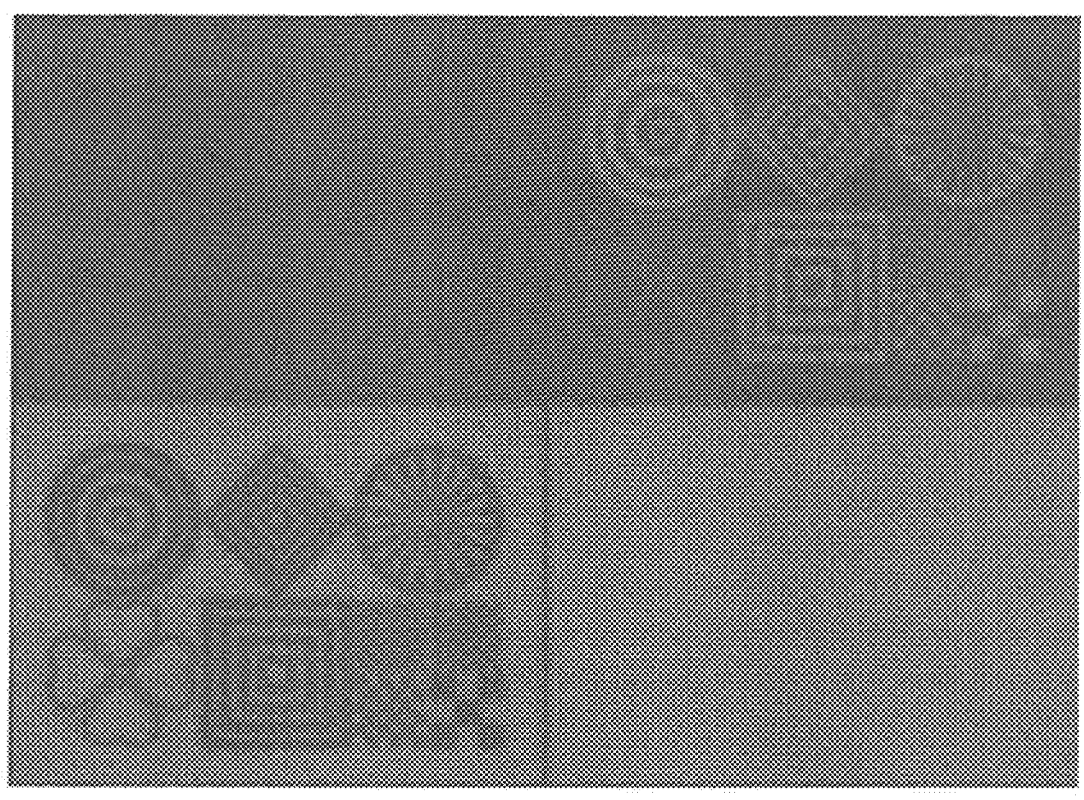
FIG. 2 shows an example of a raw image acquired from an image sensor, before any processing, according to an embodiment of the disclosure.
Figure 4:
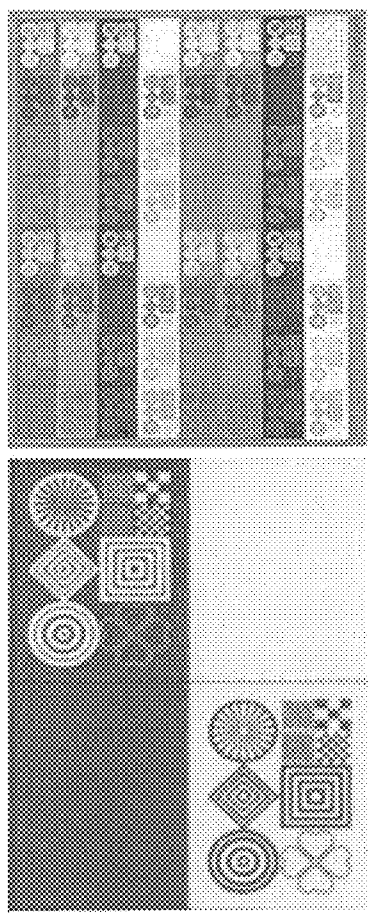
FIG. 4 shows examples of flat pure color and color mixed patches, according to an embodiment of the disclosure.

Embodiments of the disclosure assume that (1) a new "false color" metric can be applied images after demosaicing, and (2) images include flat "pure colors" areas for color measurements, and also areas with a distinct mixture of the measured colors. FIG. 2 shows an example of a raw image acquired from an image sensor, before any processing. The term 'false color' refers to a color type artifact in which a pixel's color value subjectively differs from a captured scene and is noticeable to a naked eye. An artifact is an area of image pixels with incorrect pixel values that cause various visual features to appear in image and that do not appear in the real captured scene. FIGS. 3A to 3E show examples of false color artifacts, and FIG. 4 shows examples of flat pure color patches and color mixed patches. These false color artifact examples are as follows.

Over-desaturation, shown in FIG. 3A, refers to a loss of color, being closer to AB color space origin (0,0) values. Visually, this looks more "gray-ish"/"black-ish"/"white-ish". The left image of FIG. 3A illustrates low over-desaturation, while the right image of FIG. 3A illustrates high over-desaturation.

False colors in saturated areas, shown in FIG. 3B, are colorful pixels in a saturated scene, usually found on edges of an object near a saturated (white/max RGB values) background.

An edge False Color, shown in FIG. 3C, is when an object's edge pixels color values are different from object and background colors.

Color Bleeding, shown in FIG. 3D, is when pixel has a color value closer to it's surrounding pixels rather than preserving it's ground truth value. In the example, blue color pixels are in the middle of the wheel, which is actually white in the real-life scene and are affected by the blue color pixels.

Color Moiré, shown in FIG. 3E, is an "aliasing" effect that occurs when frequencies higher than the sampling frequency (CFA frequency) are present in the image, or there are frequencies that are nearly, but not exactly aligned, with the sampling frequency. The upper image in FIG. 3E shows a scene, while the lower image shows the scene with the Moire' effect.

Figure 5:
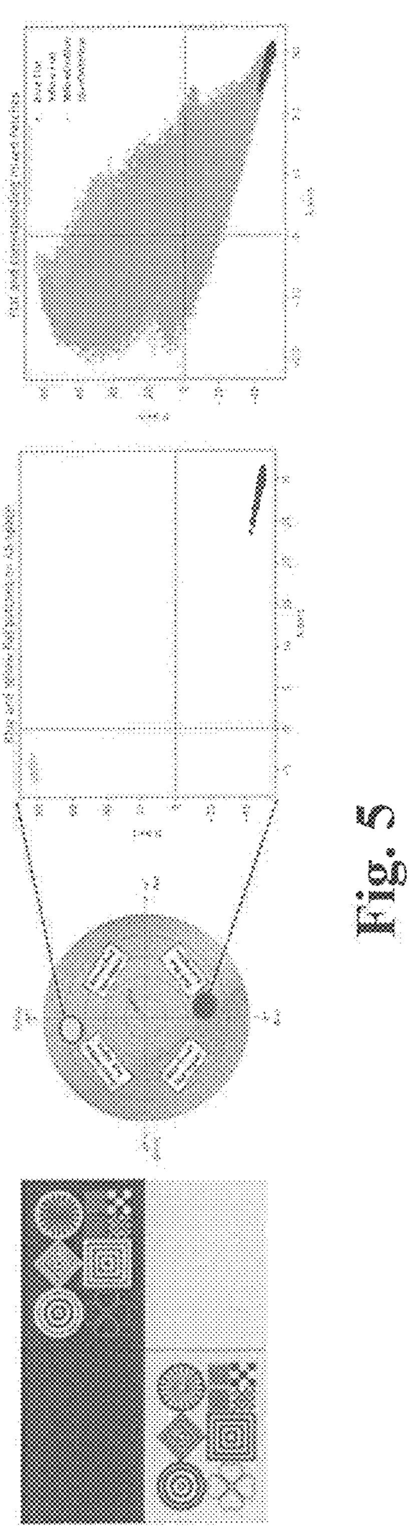
FIG. 5 shows examples of flat and color mixed texture patches and pixel distributions in LAB color space, according to an embodiment of the disclosure.

FIG. 5 shows examples of flat and color mixed texture patches and pixel distributions in LAB color space, according to an embodiment of the disclosure. Referring to FIG. 5, the far left image is an example of an RGB image output from the ISP chain. The upper right and the lower left are each a mixed color area. In each of these areas, a user can separately evaluate an IQV metric according to an embodiment. In addition, each of these areas includes 6 mixed color objects that have different characteristics, such as density between mixed color pixels, direction of pixels, etc. A user can create or use any kind of pattern object and may decide whether evaluate a metric on all objects or just part of them.

The middle right and the far right images of FIG. 5 are examples of the LAB color space image obtained by transforming the RGB image to the LAB color space. In the graphs in the middle right and the far right of FIG. 5, the horizontal A-axis represents a* values, and the vertical B-axis represents b* values. The middle right graph blue and yellow flat patches in the a*b* space, and the far right graph shows the flat and corresponding mixed patches in the a*b* space. The flat and corresponding mixed patches can be readily identified and distinguished in the LAB color space by their coordinates. Theoretically, "pure" flat patches should be represented by dots in LAB color space. Practically, due to printing accuracy, lens shading correction, ISP chain and different types of noise, a distribution is obtained instead of a single dot when an RGB image output from ISP chain is transformed to LAB color space.

The pure color patches are distinguished from mixed color patches in LAB color space as shown in the far right image of FIG. 5. A LAB color space is designed to be perceptual. A vector in the LAB color space can be decomposed into 2 vectors—radial and tangential. The radial vector represents the intensity of the color and the tangential vector represent the color hue. LAB coordinates are cylindrical coordinates, unlike the RGB Cartesian coordinates, and the distance in this color space is a measure of how much the color will appear to be different to a viewer. This is not the case when using RGB coordinates: in the RGB color space, the distance is not always correlated to the subjective impression. The YellowOnBlue/BlueOn Yellow patches in FIG. 5 are the mixed color patches pixels. The spread of dots between the two centers in the far right image means that the image shows all the hues between the two pure colors. Hues can also be darker or brighter, which will manifest in a change in the L value, or can be desaturated, which are the points closer to the axis origin, and are affected by the ISP chain.

An IQV Metric Evaluation according to an embodiment of the disclosure scales a difference in chrominance between pure color flat areas and color mixed texture areas. Each mixed color area has different pixel distribution in the a*-b* plane that may be affected by several potential causes, such as printed accuracy and the ISP chain.

From each pixel in the mixed color texture area, the chromatic distance is calculated. An example of a chromatic distance is a Euclidian distance to the '(a*, b*) center' of the corresponding pure color flat area. Each '(a*, b*) center' is defined as a function of the pixel's values in the pure color flat area and can be evaluated in different numeric ways, such as a mean of color values, depending on the pixel's distribution.

Depending on a desired false color artifact type, one can adjust the metric and use different chromatic distances rather than just Euclidian distances. For example, to objectively detect an over-saturated false color that is seen as a color loss (gray hue), using a Euclidean distance as a scalar is not sufficient, and a projection towards origin may be needed to define the IQV metric. The larger the projected distance, the closer the pixel color value is to the non-chromatic area, and thus, an increased color loss. Other adjustments include using 2D distances (A*B*) instead of 3D distances (L*A*B*) and using the 2D angle between the color center and the color distribution in AB space. A tangential distance can be used to calculate the change of color hue which may refer to other types of false color artifacts, such as bleeding false color artifact.

Figure 6:
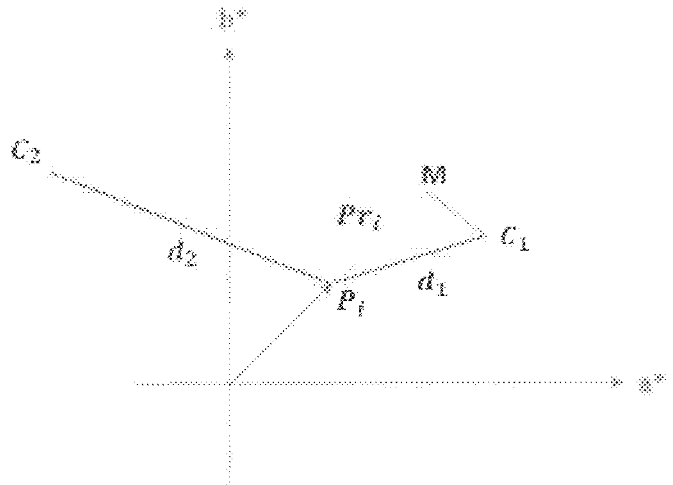
FIG. 6 shows an example of a projected "chromatic distance" towards the origin, according to an embodiment of the disclosure.

For example, denote a pixel in a color mixed texture area in an LAB color space as $P_i$, where i=1, . . . , N, and N is the number of pixels in a color mixed texture area. The projection, shown in FIG. 6, which depicts a space defined by the a* and b* axes, is defined as a dot product of the "tested pixel—flat center area" distance vector and the direction of the "tested pixel" vector towards the origin unit vector, where the center of a flat area is determined from the mean location of the flat area pixel values in the flat area. Referring to FIG. 6, let:

$d_1$ be the distance from the tested pixel to the center of flat area 1;

$d_2$ be the distance from the tested pixel to the center of flat area 2;

$C_1$ be the center of flat area 1;

$C_2$ be the center of flat area 2;

$P_i$ be the tested pixel in a color mixed texture area;

$Pr_i$ be the dot product $\min(\vec{d_1}, \vec{d_2})$. $\hat{P}_i$, which is also the radial projection of $d_1$, and M is the point where the radial projection of $d_1$ and the tangential projection of $d_1$ meet.

Assuming that $d_1 < d_2$, therefore:

$$Pr_i = \overrightarrow{d_1} \cdot \hat{P}_i = \frac{\mathrm{abs}((P_{i_{a*}} - C_{1_{a*}}) * P_{i_{a*}}) + \mathrm{abs}((P_{i_{b*}} - C_{1_{b*}}) * P_{i_{b*}})}{\sqrt{P_{1_{a*}}^2 + P_{1_{b*}}^2}}, \qquad (1)$$

where $C_{1a*}$ is an a* coordinate in the LAB color space of the center of the flat pure color patch, $C_{1b*}$ is a b* coordinate in the LAB color space of a center of the flat pure color patch, and $\hat{P}_i$ is the mixed color pixel in the color mixed texture area, with coordinates $P_{ia*}$ and $P_{ib*}$ in the LAB color space.

Figure 7:
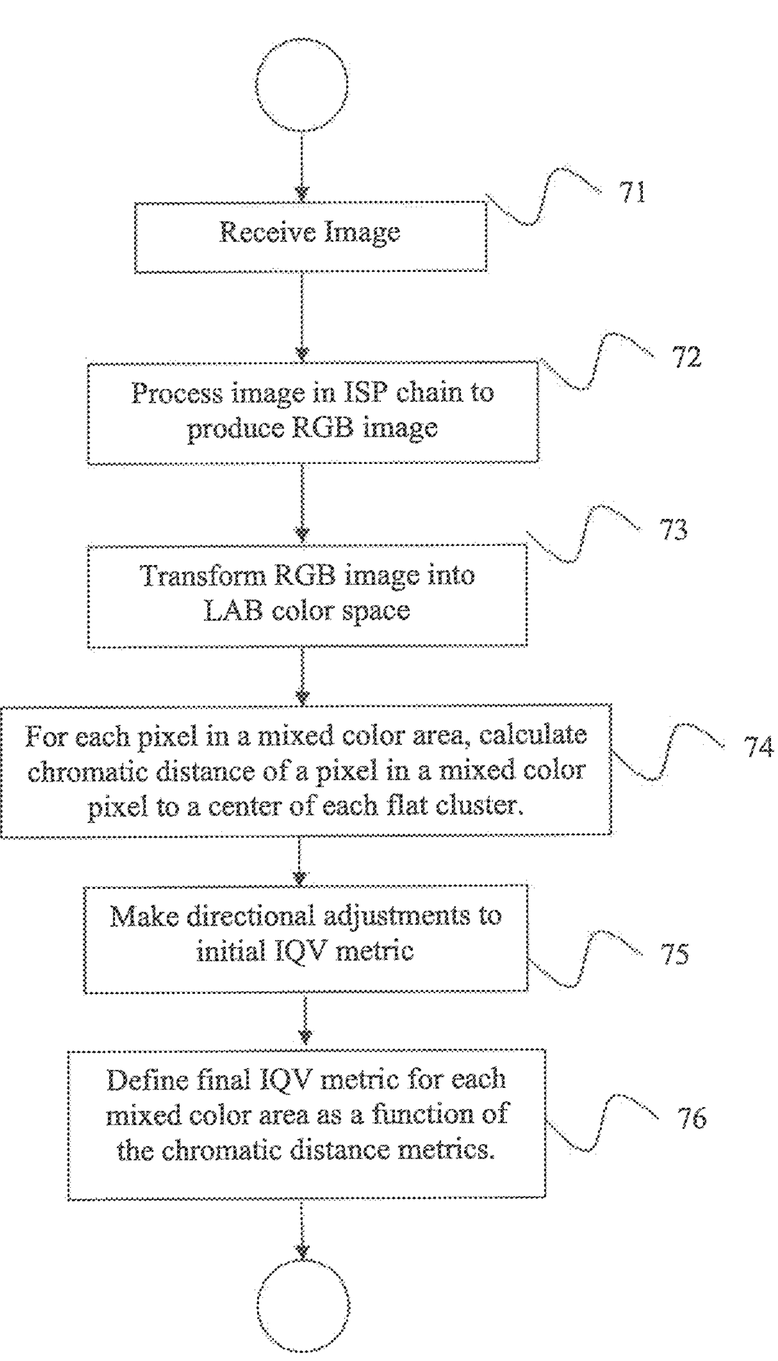
FIG. 7 is a flow chart of a method for false color IQV metric evaluation, according to an embodiment of the disclosure.
Figure 8A:
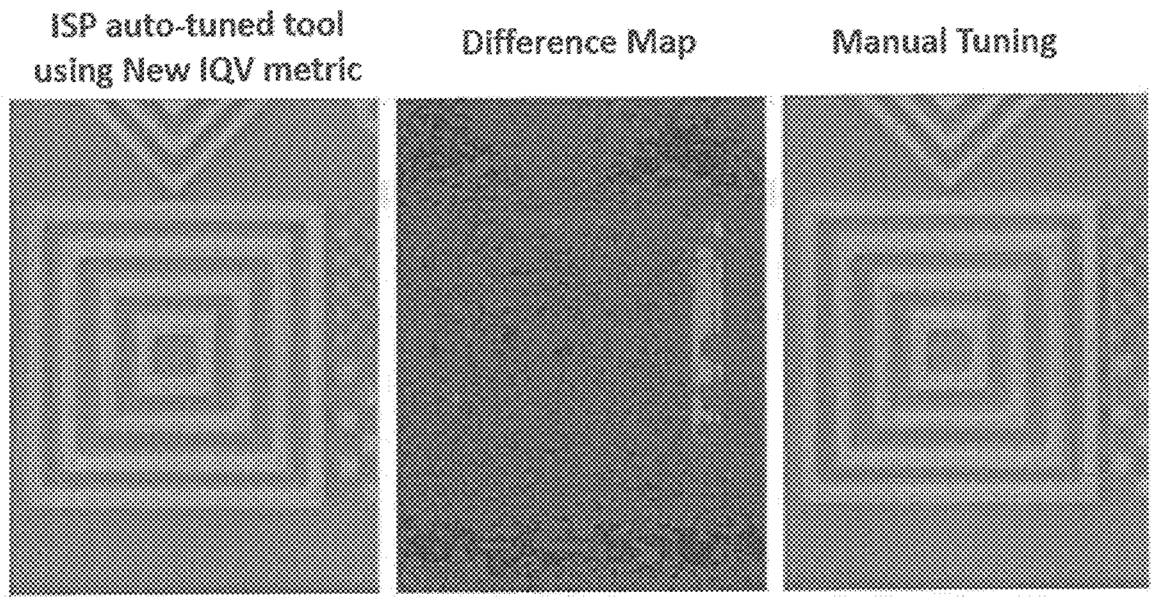
FIGS. 8A-D illustrate a comparison between a best manual tuning achieved by a professional image quality engineer compared to an "ISP auto-tuned" tool using an IQV false color metric according to an embodiment.
Figure 8B:
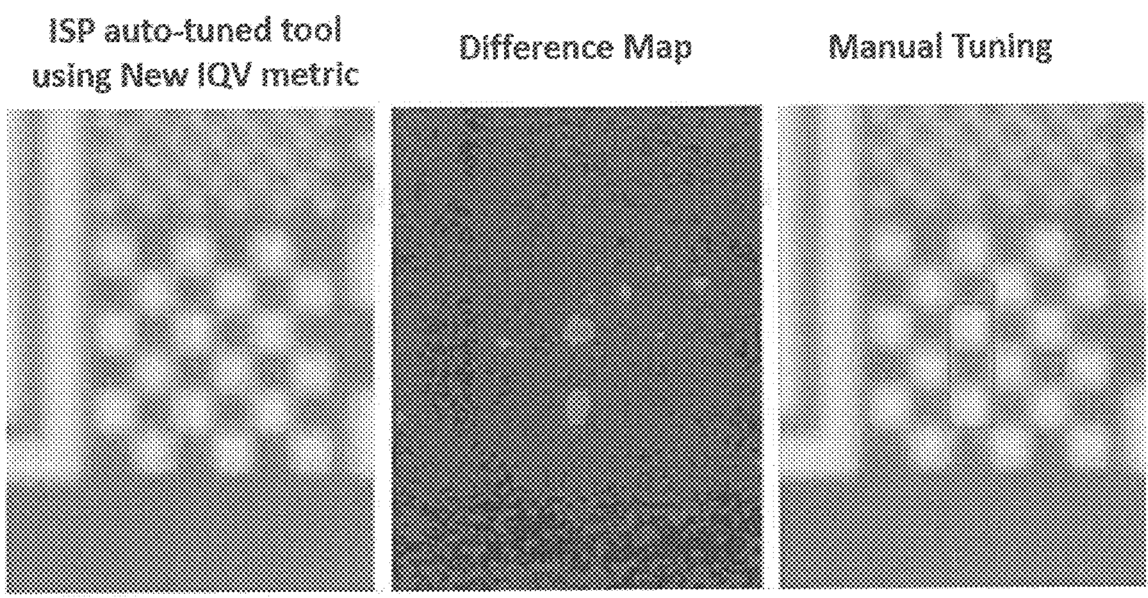
Figure 8C:
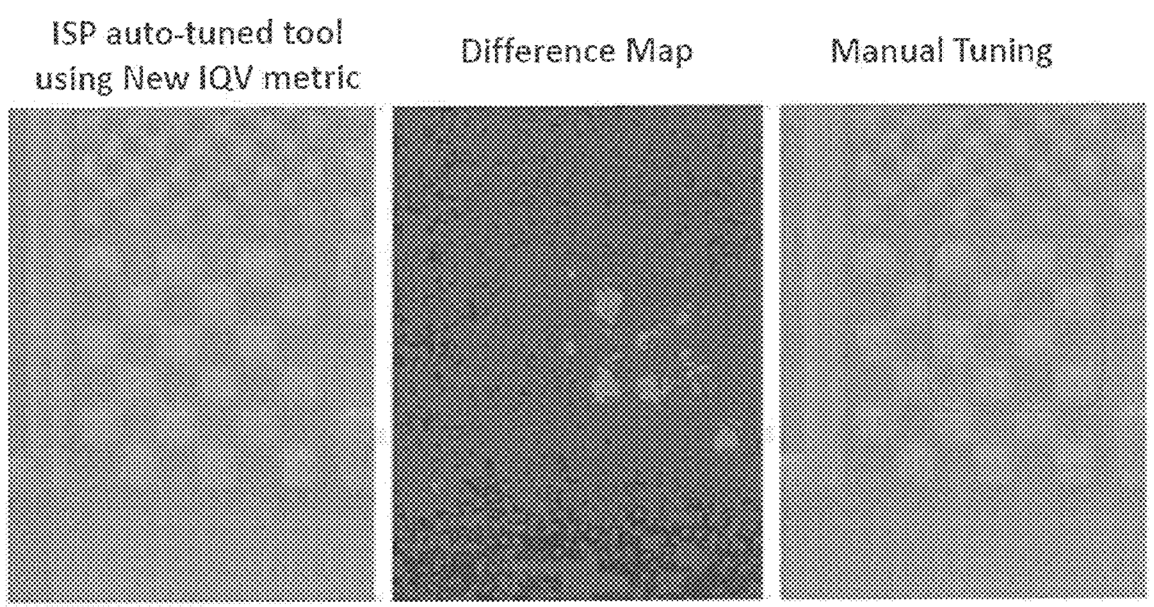
Figure 8D:
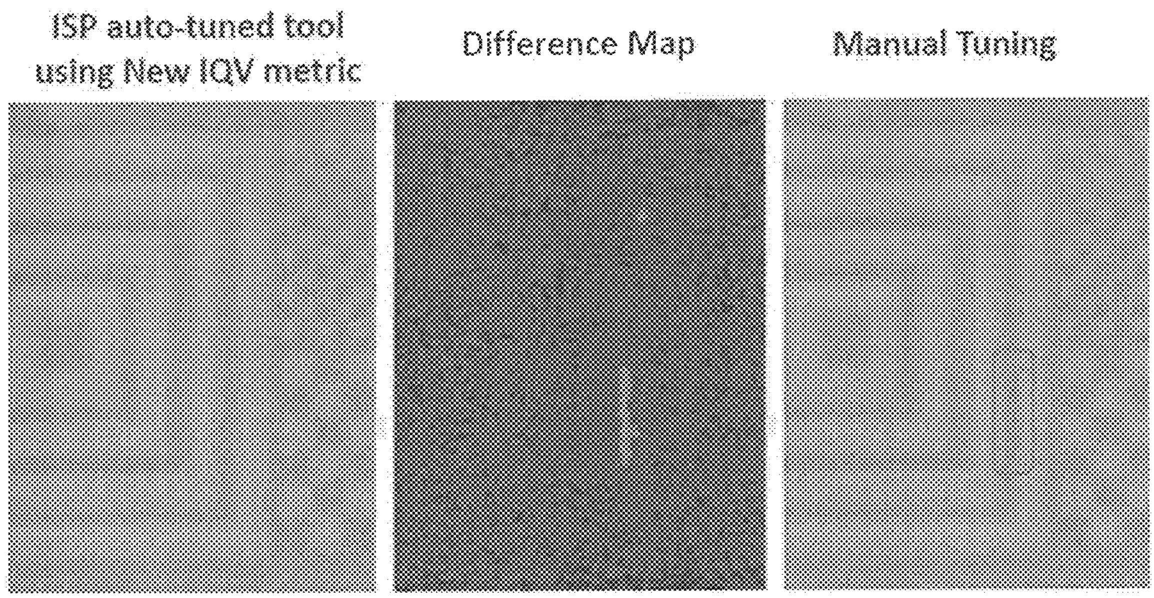

According to an embodiment, a false color metric in each mixed color area can be defined by a highest $Pr_i$ value over all pixels in the mixed color space or by a mean of a user defined percentage of the highest $Pr_i$s. An example of a method according to an embodiment for determining an IQV metric for false color in chromatic areas in a CIELAB color space is as follows, with reference to the flowchart of FIG. 7. Referring now to the figure, a method begins at step 71 by receiving an image that includes both flat pure color patches and corresponding mixed color texture patches, such as the image of FIG. 1. At step 72, the image is processed in an ISP chain with demosaicing to produce an RGB image. The RGB image is transformed into a LAB color space image at step 73. At step 74, for each pixel in a mixed color area, the chromatic distance from the mixed color pixel to the center of each flat cluster is calculated. At step 75, directional adjustments, such as a distance projection toward the origin, for different types of false color artifacts are made to each of the chromatic distances. For example, instead of using Euclidian distances between mixed color pixel value and flat cluster center value, a user can decide to use the projection towards the AB origin (0,0) which implies a change in chroma in terms of color loss, also called over-desaturation. AB (0,0) represents white/black in RGB terms and small radiuses from the origin in AB color space are gray hue colors. Finally, at step 76, a final IQV metric is defined for the mixed color area in the image as a function of the chromatic distances based on all the directionally adjusted distances calculated for the mixed color area. Steps 74 to 76 can be repeated for each mixed color area in the image.

An IQV metric according to an embodiment of the disclosure for "false color" artifacts enables testing for color leakage in all basic color (RGBCYM) combinations. An IQV workflow according to an embodiment is efficient, and enables a significant reduction in manual ISP color-blocks tuning. An IQV metric can be used in automated processes as a part of automatic ISP tuning systems, cost-functions in machine learning ISP-NN implementations, and automatic data labeling of the mixed-color texture areas as a reliable data-base for training deep learning models and test validations. Utilization of an IQV metric according to an embodiment achieves better image quality performance in 'false color' image artifact types.

FIGS. 8A-D present four sets of images, in which each set of images includes an image on the right side obtained using a best manual tuning achieved by a professional image quality engineer and an image on the left side obtained using an "ISP auto-tuned" tool that uses an IQV false color metric according to an embodiment. The middle image is a difference between the left and right images with a chosen threshold, and the area that is outlined in the right side images shows an over-desaturation type of false color.

It is to be understood that embodiments of the present disclosure can be implemented in various forms of hardware, software, firmware, special purpose processes, or a combination thereof. In one embodiment, a method for determining an IQV metric for false color in chromatic areas in a CIELAB color space can be implemented in hardware as an application-specific integrated circuit (ASIC), or as a field programmable gate array (FPGA). In another embodiment, algorithms can be implemented in software as an application program tangible embodied on a computer readable program storage device. The application program can be uploaded to, and executed by, a machine comprising any suitable architecture.

Figure 9:
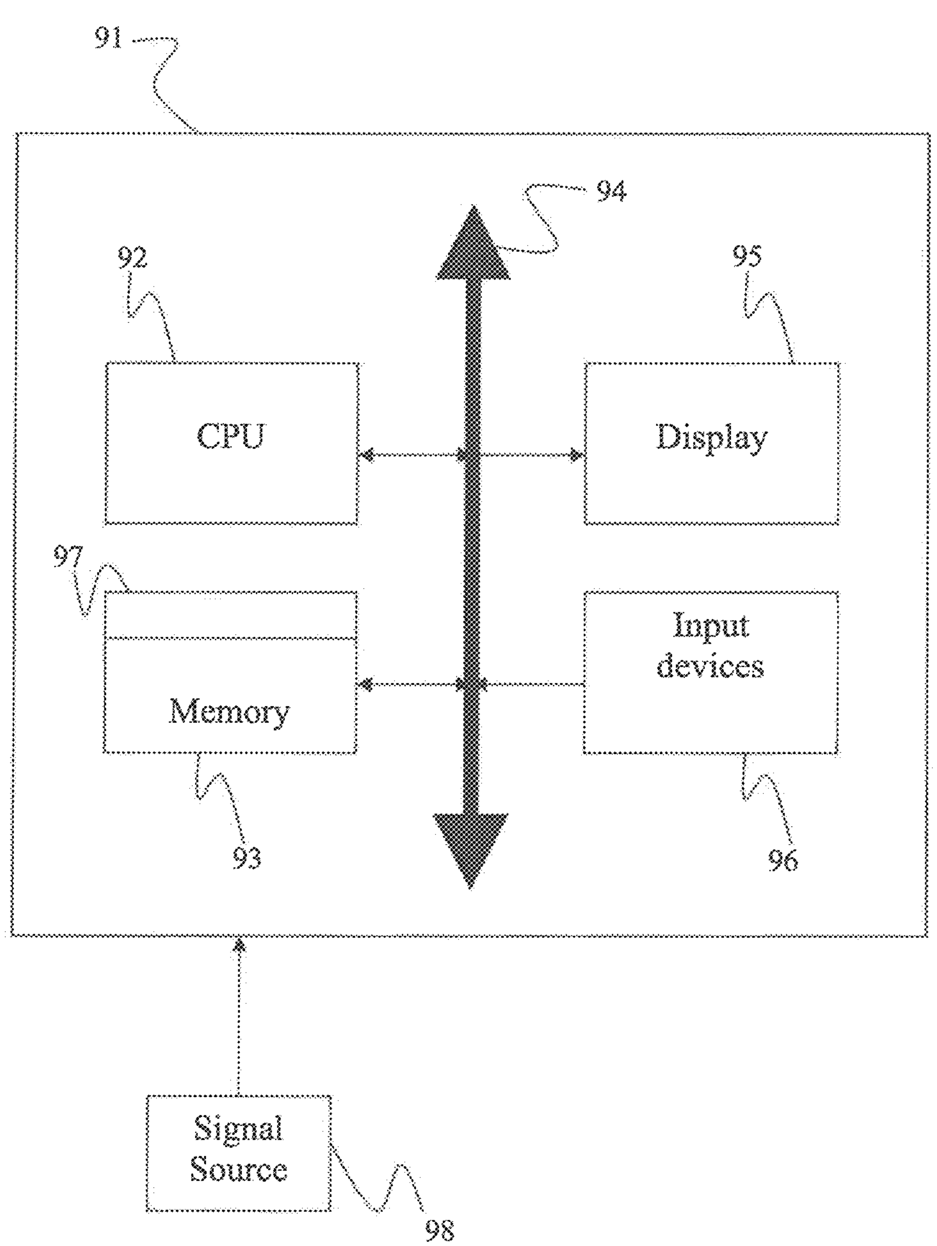
FIG. 9 is a block diagram of a system for implementing a method of false color IQV metric evaluation, according to an embodiment of the disclosure.

FIG. 9 is a block diagram of a system for implementing a method for determining an IQV metric for false color in chromatic areas in a CIELAB color space, according to an embodiment of the disclosure. Referring now to FIG. 9, a computer system 91 includes, inter alia, a central processing unit (CPU) or controller 92, a memory 93 and an input/output (I/O) interface 94. The computer system 91 is generally coupled through the I/O interface 94 to a display 95 and various input devices 96 such as a mouse and a keyboard. The support circuits can include circuits such as cache, power supplies, clock circuits, and a communication bus. The memory 93 can include random access memory (RAM), read only memory (ROM), disk drive, tape drive, etc., or a combinations thereof. Algorithms according to embodiments of the present disclosure can be implemented as a routine 97 that is stored in memory 93 and executed by the CPU or controller 92 to process the signal from the signal source 98. As such, the computer system 91 is a general purpose computer system that becomes a specific purpose computer system when executing the routine 97 of the present disclosure. Alternatively, as described above, embodiments of the present disclosure can be implemented as an ASIC or FPGA 97 that is in signal communication with the CPU or controller 92 to process the signal from the signal source 98.

The computer system 91 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present disclosure is programmed. Given the teachings of the present disclosure provided herein, one of ordinary skill in the related art will be able to contemplate these and similar implementations or configurations of the present disclosure.

While the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method for determining an image quality verification (IQV) metric for false color artifacts in chromatic areas of digital images, comprising:

receiving a digital image that includes one or more flat pure color patches and one or more mixed color texture patches;

processing the digital image in an image signal processing (ISP) chain such that a red/green/blue (RGB) image is produced;

transforming the RGB image into an LAB color space image;

calculating, for each mixed color pixel in a mixed color texture patch, a chromatic distance in the LAB color space from the mixed color pixel in the mixed color texture patch to a center of each flat pure color patch;

performing directional adjustments on each of the chromatic distances; and defining, for each mixed color patch, the IQV metric for the mixed color patch as a function of the distance metrics of each mixed color texture pixel in the mixed color patch.

2. The method of claim 1, wherein the ISP chain includes demosaicing.

3. The method of claim 1, wherein the function of the distance metrics of each mixed color texture pixel includes one of a maximum or a mean of the distance metrics over a predetermined top quantile of the distance metrics.

4. The method of claim 1, wherein a center of a flat pure color area is determined from a mean location of pixel values in the flat pure color patch.

5. The method of claim 1, wherein a chromatic distance in the LAB color space from the mixed color pixel in the mixed color texture patch to a center of each flat pure color patch is a Euclidian distance to the (a*, b*) center of each flat pure color patch with a directional adjustment.

6. The method of claim 5, wherein the directional adjustments include replacing a Euclidean distance between a mixed color pixel and a center of a flat pure color patch with a radial projection towards an AB origin of the LAB color space, or with a tangential projection, or with a weighted sum of the projections.

7. The method of claim 6, wherein the projection of the Euclidean distance between a mixed color pixel i and a center of a flat pure color patch towards an AB origin of the LAB color space that represents a radial distance is calculated from $$Pr_i = \overrightarrow{d_1} \cdot \hat{P}_\iota = \frac{\mathrm{abs}\left(\left(P_{i_{a*}} - C_{1_{a*}}\right) * P_{i_{a*}}\right) + \mathrm{abs}\left(\left(P_{i_{b*}} - C_{1_{b*}}\right) * P_{i_{b*}}\right)}{\sqrt{P_{1_{a*}}^2 + P_{1_{b*}}^2}}$$

$d_1$ is a distance from the mixed color pixel to the center of a flat pure color patch, $C_{1a*}$ is an a* coordinate in the LAB color space of the center of the flat pure color patch, $C_{1b*}$ is a b* coordinate in the LAB color space of a center of the flat pure color patch, and $\hat{P}_i$ is the mixed color pixel in the color mixed texture patch, with coordinates $P_{ia*}$ and $P_{ib*}$ in the LAB color space.

8. A method for determining an image quality verification (IQV) metric for false color artifacts in chromatic areas of digital images, comprising:

calculating, for each mixed color pixel in a mixed color texture patch in a LAB color space image that includes one or more flat pure color patches and one or more mixed color texture patches, a chromatic distance in the LAB color space from the mixed color pixel in the mixed color texture patch to a center of each flat pure color patch, wherein a chromatic distance in the LAB color space from the mixed color pixel in the mixed color texture patch to the center of each flat pure color patch is a Euclidian distance to the (a*, b*) center of each flat pure color patch with directional adjustments, wherein the directional adjustments include replacing a Euclidean distance between a mixed color pixel and a center of a flat pure color patch with a radial projection towards an AB origin of the LAB color space, or with a tangential projection; and defining, for each mixed color patch, the IQV metric for the mixed color patch as a function of the distance metrics of each mixed color texture pixel in the mixed color patch.

9. The method of claim 8, wherein the projection of the Euclidean distance between a mixed color pixel i and a center of a flat pure color patch towards an AB origin of the LAB color space that represents a radial distance is calculated from $$Pr_i = \overrightarrow{d_1} \cdot \hat{P}_i = \frac{\text{abs}((P_{i_{a*}} - C_{1_{a*}}) * P_{i_{a*}}) + \text{abs}((P_{i_{b*}} - C_{1_{b*}}) * P_{i_{b*}})}{\sqrt{P_{1_{a*}}^2 + P_{1_{b*}}^2}}$$

$d_1$ is a distance from the mixed color pixel to the center of a flat pure color patch, $C_{1a*}$ is an a* coordinate in the LAB color space of the center of the flat pure color patch, $C_{1b*}$ is a b* coordinate in the LAB color space of a center of the flat pure color patch, and $\hat{P}_i$ is the mixed color pixel in the mixed color texture patch, with coordinates $P_{ia*}$ and $P_{ib*}$ in the LAB color space.

10. The method of claim 8, further comprising:

receiving a digital image that includes a plurality of flat pure color patches and a plurality of mixed color texture patches;

processing the digital image in an image signal processing (ISP) chain such that a red/green/blue (RGB) image is produced; and transforming the RGB image into a digital LAB color space image.

11. The method of claim 10, wherein the ISP chain includes demosaicing.

12. The method of claim 10, wherein a center of a flat pure color area is determined from a mean location of pixel values in the flat pure color patch.

13. The method of claim 8, wherein the function of the distance metrics of each mixed color texture pixel is one of a maximum or a mean of the distance metrics over a predetermined top quantile of the distance metrics.

14. A non-transitory program storage device readable by a computer, tangibly embodying a program of instructions executed by the computer to perform a method for determining an image quality verification (IQV) metric for false color artifacts in chromatic areas of digital images, the method comprising:

receiving a digital image that includes one or more flat pure color patches and one or more mixed color texture patches;

processing the digital image in an image signal processing (ISP) chain such that a red/green/blue (RGB) image is produced;

transforming the RGB image into an LAB color space image;

calculating, for each mixed color pixel in a mixed color texture patch, a chromatic distance in the LAB color space from the mixed color pixel in the mixed color texture patch to a center of each flat pure color patch;

performing directional adjustments on each of the chromatic distances; and defining, for each mixed color patch, the IQV metric for the mixed color patch as a function of the distance metrics of each mixed color texture pixel in the mixed color patch.

15. The non-transitory computer readable program storage device of claim 14, wherein the ISP chain includes demosaicing.

16. The non-transitory computer readable program storage device of claim 14, wherein the function of the distance metrics of each mixed color texture pixel includes one of a maximum or a mean of the distance metrics over a predetermined top quantile of the distance metrics.

17. The non-transitory computer readable program storage device of claim 14, wherein a center of a flat pure color area is determined from a mean location of pixel values in the flat pure color patch.

18. The non-transitory computer readable program storage device of claim 14, wherein a chromatic distance in the LAB color space from the mixed color pixel in the mixed color texture patch to a center of each flat pure color patch is a Euclidian distance to the (a*, b*) center of each flat pure color patch with a directional adjustment.

19. The non-transitory computer readable program storage device of claim 18, wherein the directional adjustments include replacing a Euclidean distance between a mixed color pixel and a center of a flat pure color patch with a radial projection towards an AB origin of the LAB color space, or with a tangential projection, or with a weighted sum of the projections.

20. The method of claim 19, wherein the projection of the Euclidean distance between a mixed color pixel i and a center of a flat pure color patch towards an AB origin of the LAB color space that represents a radial distance is calculated from $$Pr_i = \overrightarrow{d_1} \cdot \hat{P}_i = \frac{\text{abs}((P_{i_{a*}} - C_{1_{a*}}) * P_{i_{a*}}) + \text{abs}((P_{i_{b*}} - C_{1_{b*}}) * P_{i_{b*}})}{\sqrt{P_{1_{a*}}^2 + P_{1_{b*}}^2}}$$

$d_1$ is a distance from the mixed color pixel to the center of a flat pure color patch, $C_{1a*}$ is an a* coordinate in the LAB color space of the center of the flat pure color patch, $C_{1b*}$ is a b* coordinate in the LAB color space of a center of the flat pure color patch, and $\hat{P}_i$ is the mixed color pixel in the mixed color texture patch, with coordinates $P_{ia*}$ and $P_{ib*}$ in the LAB color space.

* * * * *